(12) United States Patent
Schmitz et al.

(10) Patent No.: US 10,130,874 B2
(45) Date of Patent: Nov. 20, 2018

(54) REMOVABLE CONTROLLER ACCESSORY FOR A GAME CONTROLLER

(71) Applicant: Microsoft Technology Licensing, LLC, Redmond, WA (US)

(72) Inventors: Aaron Schmitz, Redmond, WA (US); Kenneth Jasinski, Seattle, WA (US); Joshua Weiher, Issaquah, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 131 days.

(21) Appl. No.: 14/702,563

(22) Filed: May 1, 2015

(65) Prior Publication Data

US 2016/0317921 A1    Nov. 3, 2016

(51) Int. Cl.
*A63F 9/24* (2006.01)
*A63F 13/00* (2014.01)
*G06F 17/00* (2006.01)
*G06F 19/00* (2018.01)
*A63F 13/24* (2014.01)
*A63F 13/98* (2014.01)
*A63F 13/23* (2014.01)
*A63F 13/20* (2014.01)

(52) U.S. Cl.
CPC ............ *A63F 13/24* (2014.09); *A63F 13/23* (2014.09); *A63F 13/98* (2014.09); *A63F 13/20* (2014.09)

(58) Field of Classification Search
CPC .......... A63F 13/06; A63F 13/24; A63F 13/22; A63F 13/23; A63F 13/98; A63F 13/20
USPC ........................................................ 463/37
See application file for complete search history.

(56) References Cited

U.S. PATENT DOCUMENTS

| | | | |
|---|---|---|---|
| 559,416 A | 5/1896 | Soper | |
| 3,996,441 A | 12/1976 | Ohashi | |
| 4,292,481 A | 9/1981 | Barnes et al. | |
| 4,755,072 A | 7/1988 | Hoornweg | |
| 5,239,450 A | 8/1993 | Wall | |
| 5,645,277 A | 7/1997 | Cheng | |
| 5,883,690 A * | 3/1999 | Meyers | A63F 13/02 345/157 |

(Continued)

FOREIGN PATENT DOCUMENTS

| | | |
|---|---|---|
| CA | 2913093 A1 | 11/2014 |
| EP | 1380924 A1 | 1/2004 |

(Continued)

OTHER PUBLICATIONS

ISA European Patent Office, International Search Report and Written Opinion issued in PCT Application No. PCT/US2016/026292, dated Jun. 21, 2016, WIPO, 9 pages.

(Continued)

*Primary Examiner* — Omkar Deodhar
*Assistant Examiner* — Wei Lee
(74) *Attorney, Agent, or Firm* — Alleman Hall Creasman & Tuttle LLP

(57) ABSTRACT

A removable controller accessory for a game controller. The removable controller accessory includes a first side and a second side opposite the first side. The first side includes a finger interface sized and shaped for manual manipulation by a finger. The second side includes a mounting interface configured to selectively mate with an accessory-retention feature of a mounting platform of the game controller to removably affix the removable controller accessory to the mounting platform.

18 Claims, 9 Drawing Sheets

(56) References Cited

U.S. PATENT DOCUMENTS

| | | | |
|---|---|---|---|
| 6,659,870 | B2 | 12/2003 | Sobota |
| 7,315,260 | B1 | 1/2008 | Lam et al. |
| 7,425,681 | B2 | 9/2008 | Xu et al. |
| 7,758,424 | B2 * | 7/2010 | Riggs .................. A63F 13/06 |
| | | | 341/20 |
| 8,289,192 | B2 | 10/2012 | O'Donnell |
| 8,592,681 | B2 | 11/2013 | Alderson et al. |
| 8,653,389 | B2 | 2/2014 | Liang et al. |
| 2002/0000975 | A1 * | 1/2002 | Perkins ............... G06F 3/0213 |
| | | | 345/168 |
| 2006/0126323 | A1 | 6/2006 | Pomes |
| 2010/0328203 | A1 | 12/2010 | Hsu |
| 2016/0228765 | A1 | 8/2016 | Rubio |

FOREIGN PATENT DOCUMENTS

| | | |
|---|---|---|
| EP | 3053635 A1 | 8/2016 |
| FR | 3032355 A1 | 8/2016 |
| FR | 3032355 B1 | 2/2017 |
| FR | 3016226 B1 | 3/2017 |
| FR | 3020762 B1 | 12/2017 |
| GB | 2463341 A | 3/2010 |
| WO | 9936136 A1 | 7/1999 |
| WO | 2007095082 A2 | 8/2007 |
| WO | 2014051515 A1 | 4/2014 |

OTHER PUBLICATIONS

Sorrel, Charlie, "Saitek Cyborg Rumblepad: Removable, Swappable Buttons", Published on: Sep. 12, 2007 Available at: http://www.wired.com/2007/09/saitek-cyborg-r/.

"This might be our first look at Nintendo's next handheld", Retrieved on: Feb. 1, 2015 Available at: http://www.gamespot.com/forums/system-wars-314159282/this-might-be-our-first-look-at-nintendo-s-next-ha-31239919/.

Varias, Lambert, "Donya iPhone Gamepad Stickers: Five Buttons to Play Them All", Published on: Mar. 30, 2011 Available at: http://technabob.com/blog/2011/03/30/donya-iphone-gamepad-stickers/.

"Noire XBOX ONE Rocker Rocker Handle Cap Cap Xbox One Rocker Cover TPU Protective Cap" Retrieved on: Feb. 1, 2015 Available at: http://www.agreetao.com/taobao/view/id/38285531788.

Steves, "RoastGeek Button Pad v 1.0", Published on: Jul. 29, 2012 Available at: http://www.roastgeek.com/wordpress/.

"The Razer Sabertooth gaming controller for the Xbox 360/PC," YouTube Website, Available Online at https://www.youtube.com/watch?feature=player_embedded&v=aaRDcV1Ryr8, Jun. 10, 2013, 5 pages.

Linder, B., "Wikipad introduces Gamevice detachable controllers for tablets," Liliputing Website, Available Online at http://liliputing.com/2014/01/wikipad-introduces-gamevice-detachable-controllers-for-tablets.html, Jan. 3, 2014, 8 pages.

IPEA European Patent Office, International Preliminary Report on Patentability Issued in PCT Application No. PCT/US2016/026292, dated Oct. 28, 2016, WIPO, 6 pages.

"AiM Controllers PS4", Aim Controllers Twitter page, Twitter website, https://twitter.com/AimControllerss?lang=en, Sep. 2, 2014, 2 pages.

"Official Controller discussion", First Person Shooter Forum—FPS Discussion Forum, fps247 website, http://fps247.com/threads/official-controller-discussion.94509/, Dec. 20, 2014, 16 pages.

* cited by examiner

REMOVABLE CONTROLLER ACCESSORY FOR A GAME CONTROLLER

BACKGROUND

A user input control device, such as a game controller may be used to provide user input to control an object or a character in a video game or to provide some other form of control. A game controller may include various types of controls that may be configured to be manipulated by a finger to provide different types of user input. Non-limiting examples of such controls may include push buttons, triggers, touch pads, joysticks, paddles, bumpers, and directional pads. The various controls may be manipulated to provide control signals that may be mapped to different operations in a video game.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A removable controller accessory for a game controller. The removable controller accessory includes a first side and a second side opposite the first side. The first side includes a finger interface sized and shaped for manual manipulation by a finger. The second side includes a mounting interface configured to selectively mate with an accessory-retention feature of a mounting platform of the game controller to removably affix the removable controller accessory to the mounting platform.

DETAILED DESCRIPTION

User input control devices, such as game controllers, may be shaped/sized to fit an average hand size of a population of users. Likewise, finger-manipulatable controls (e.g., push buttons, triggers, joysticks, directional pads) that are integral to a game controller have traditionally been designed according to a "one size fits all" approach. However, different users may have different preferences on the shape, size, color, texture, or other attributes of such controls.

The present disclosure is directed to a customizable game controller that includes one or more finger manipulatable controls that can be swapped out in a tool-free manner. For example, such a configuration may facilitate the use of differently configured removable controller accessories that are customized for particular types of video games to be quickly swapped on the game controller when switching between playing different video games. In another example, such a configuration may facilitate the use of differently configured removable controller accessories that are preferred by different players to be quickly swapped on the game controller when the game controller is used by the different players.

Figure 1:
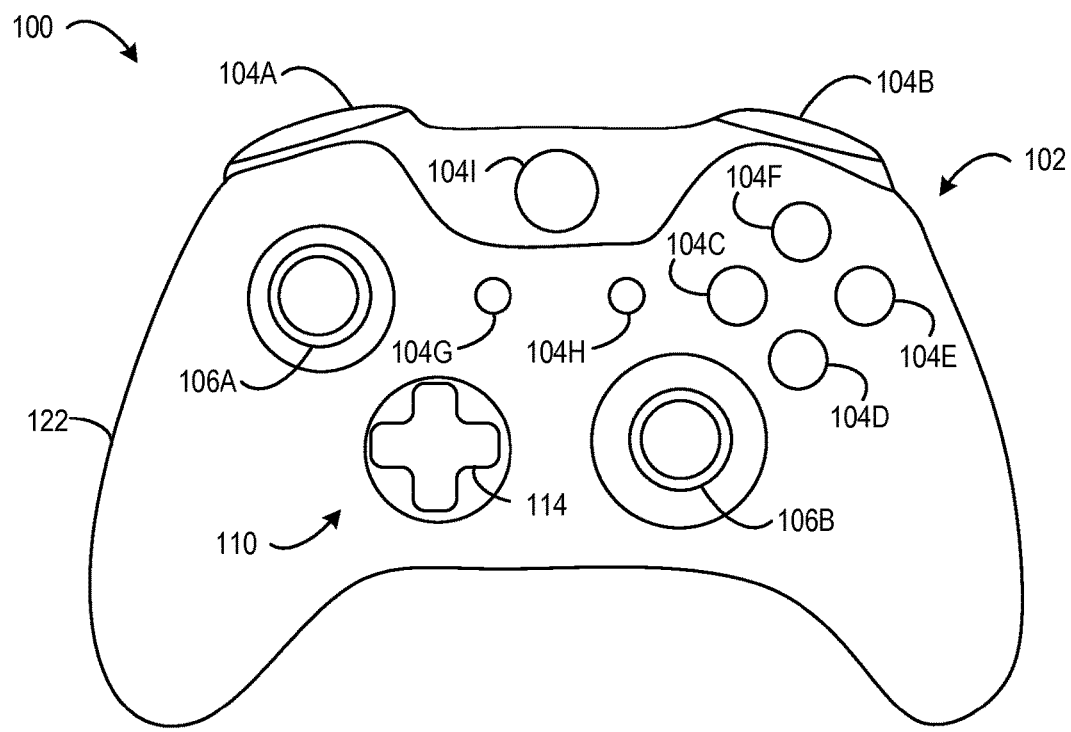
FIG. 1 shows a front of an example game controller.
Figure 2:
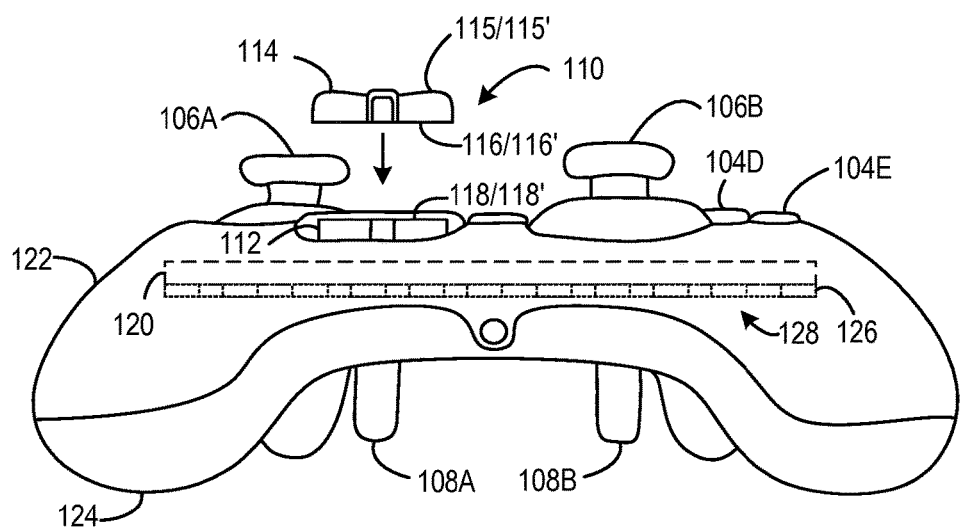
FIG. 2 shows a bottom view of the game controller of FIG. 1 with a removable controller accessory aligned to be removably affixed to a mounting platform.

FIGS. 1 and 2 show an example user input control device in the form of a game controller 100. The game controller 100 may be configured to translate user input into control signals that are provided to a computing device, such as a gaming console. The control signals may be mapped to commands to control a video game or perform other operations. For example, the game controller 100 may be configured to send control signals via a wired or wireless connection with a computing device.

The game controller 100 includes a plurality of controls 102 configured to generate different control signals responsive to finger manipulation. One or more of the plurality of controls 102 may include a removable finger pad 114. The removable finger pad 114 may be one of a plurality of differently configured removable controller accessories removably affixable to the game controller 100. For example, various differently configured removable controller accessories may have different sizes, shapes, and/or textured surfaces that are preferred by different users or may be suited for particular gaming or other purposes.

In the depicted implementation, the plurality of controls 102 includes a plurality of action buttons 104 (e.g., 104A, 104B, 104C, 104D, 104E, 104F, 104G, 104H, and 104I), a plurality of joysticks 106 (e.g., a left joystick 106A and a right joystick 106B), a plurality of triggers 108 (e.g., a left trigger 108A and a right trigger 108B), and a directional pad 110. The plurality of controls 102 may be coupled to a frame 120 (shown in more detail in FIG. 9). The frame 120 may be contained collectively within an upper housing portion 122 and a lower housing portion 124 of the game controller 100. In other words, the upper housing portion 122 and the lower housing portion 124 may cooperate to form a housing that contains at least a portion of each of the plurality of controls 102 that are coupled to the frame 120.

A printed circuit board 126 may be coupled to the frame 120. The printed circuit board 126 may include a plurality of electronic input sensors 128. Each electronic input sensor may be configured to generate an activate control signal responsive to interaction with a corresponding control. Non-limiting examples of electronic input sensors may include dome switches, tactile switches, Hall Effect sensors, potentiometers, and other electronic sensing components. Any suitable sensor may be implemented in the game controller 100. In some implementations, two or more printed circuit boards may be used.

The game controller 100 may include any number of controls, any type of controls, any number of electronic input sensors, and any type of electronic input sensors without departing from the scope of this disclosure.

Each of the action buttons 104 may be configured to activate a corresponding electronic input sensor 128 to generate an activate control signal responsive to being depressed (e.g., via finger manipulation). For example, each control signal associated with an action button may be mapped to a video game operation. Different video games may have different mappings of control signals to operations. In some cases, each action button may be mapped to a different operation. In other cases, two action buttons may be mapped to a same operation.

Each of the joysticks 106 may be configured to provide two-dimensional input that is based on a position of the joystick in relation to a default "center" position. For example, the joysticks may interact with electronic input sensors in the form of potentiometers that use continuous electrical activity to provide an analog input control signal.

Each of the triggers 108 may be configured to provide a variable control signal based on a position of the trigger relative to a default position. For example, as a trigger is pulled farther away from the default position a characteristic of the generated control signal may increase in magnitude.

In the depicted implementation, the directional pad 110 is the only control on the game controller 100 that is configured to interface with a plurality of differently configured removable controller accessories such that a selected removable controller accessory may be removably affixed to the game controller 100. In particular, the directional pad 110 includes a mounting platform 112 configured to interface with a selected removable controller accessory in the form of a removable finger pad 114. The mounting platform 112 may include a topside 118 including an accessory-retention interface 118' configured to interface with a mounting interface 116' of the removable finger pad 114.

As such, the directional pad 110 includes the mounting platform 112 and the removable finger pad 114 when the removable finger pad 114 is removably affixed to the mounting platform 112.

In the illustrated example, the removable finger pad 114 has a cross-shaped structure that includes a plurality of branches that extend in four different directions (e.g., up, down, left, right). The removable finger pad 114 may include a topside 115 that includes a finger interface 115'. The finger interface 115' may include any suitable surface, feature, shape, and/or structure configured to be touched and/or manually manipulated by a finger to provide user input.

The removable finger pad 114 may include an underside 116 that is opposite the topside 115. The underside 116 may include the mounting interface 116'. The mounting interface 116' may include any suitable surface, feature, shape, and/or structure configured to selectively mate with the mounting platform 112 to removably affix the removable finger pad 114 to the game controller 100. For example, the mounting interface 116' of the removable finger pad 114 may have a shape that complements a shape of an accessory-retention interface 118' of the mounting platform 112. Such corresponding interfaces may aid the removable finger pad 114 in aligning with the mounting platform 112 to removably affix the removable finger pad 114 to the game controller 100.

Furthermore, the mounting platform 112 may include one or more accessory-retention features (examples of which are shown at least at FIGS. 5-6 and 14-19) configured to removably affix various removable controller accessories to game controller 100 without the use of any tools. Such accessory-retention features may allow for differently configured removable controller accessories to be quickly and easily interchanged without the use of tools.

The directional pad 110 may be configured to reside in a default posture when no touch force is applied to the directional pad 110. In the default posture, the directional pad 110 does not cause any of the plurality of electronic input sensors 128 to generate an activate control signal indicative of touch input. Further, the directional pad 110 may be configured to move from the default posture to a selected activation posture responsive to a touch force being applied to the directional pad 110. The selected activation posture may be one of a plurality of different activation postures that each generate a different activate control signal or combination of activate control signals by interfacing with different electronic input sensors.

Note that the activation signal indicative of touch input produced in the selected activation posture may be any signal that differs from a signal or lack thereof produced in the default posture. For example, in some implementations, the activation signal may correspond to a supply voltage (e.g., VDD) of the game controller 100 and the signal produced in the default state may correspond to a relative ground. (e.g., 0). In other implementations, the activation signal may correspond to a relative ground and the signal produced in the default state may correspond to the supply voltage of the game controller 100.

In the depicted implementation, the directional pad 110 is depressable in four different directions (e.g., up, down, left, and right) to interface with different electronic input sensors that generate different activate control signals. In some implementations, the four different directions may correspond to four different activation postures that generate four different activate control signals to provide four-way directional input. In some implementations, combinations of activate control signals corresponding to pressing the directional pad 110 in two directions (e.g., up and left) at one time may be interpreted as additional activation postures corresponding to diagonals in between the four directions to provide eight-way directional input. In some implementations, the directional pad 110 may include a number of directions different than four or eight. For example, the directional pad 110 may include two or more different directions.

Note that the mounting platform 112 may be further configured such that when a removable controller accessory is not affixed to the mounting platform 112, a touch force may be applied directly to the mounting platform 112. The mounting platform 112 may be configured to translate the touch force into movement of the mounting platform 112 that applies an activation force to one or more electronic input sensors to generate one or more different control signals. In other words, the mounting platform 112 may function as a directional pad itself when a removable controller accessory is not affixed to the mounting platform 112. In one example, an activation force may include an amount of force sufficient to actuate a dome switch. The activation force may be any suitable amount of force to activate an electronic input sensor.

Although the mounting platform 112 may translate a touch force to an activation force, the mounting platform 112 may otherwise differ from a traditional directional pad. For example, the mounting platform 112 may be recessed from a surface of the upper housing portion 122 of the game controller 100 in order to accommodate a thickness of the removable finger pad 114. As such, the removable finger pad 114 will not excessively protrude from the mounting platform 112 and interfere with operation of other controls (e.g., joystick 106A) of the game controller 100. Further, the topside 118 of the mounting platform 112 may have abrupt edges that are configured to mate with the finger pad 114. In contrast, traditional directional pads may have edges and surfaces that are contoured to comfortably accommodate a user's thumb.

In the depicted implementation, the directional pad 110 is the only control of the plurality of controls 102 on the game controller 100 that is configured to removably affix differently configured removable controller accessories to the game controller 100. In other implementations, the game controller 100 may include more than one control that is configured to removably affix differently configured removable controller accessories to the game controller 100. Further, in some implementations, the game controller 100 may include different types of controls other than the directional pad 110 that are configured to removably affix differently configured removable controller accessories to the game controller. For example, one or more of the joysticks, action buttons, or triggers may be configured to removably affix differently configured removable controller accessories to the game controller 100.

In some implementations where two different controls are configured to removably affix removable controller accessories to the game controller 100, each such control may be configured to interact with a different group of removable controller accessories. In particular, the different removable controller accessories in a given group may have a same mounting interface that is configured to be removably affixed to a particular control. In other words, a selected removable controller accessory may only be compatible with one of the two controls. In other implementations, where two different controls are configured to removably affix removable controller accessories to the game controller 100, both controls may be configured in the same manner such that a selected removable controller accessory may be compatible to be removably affixable to both controls.

Figure 3:
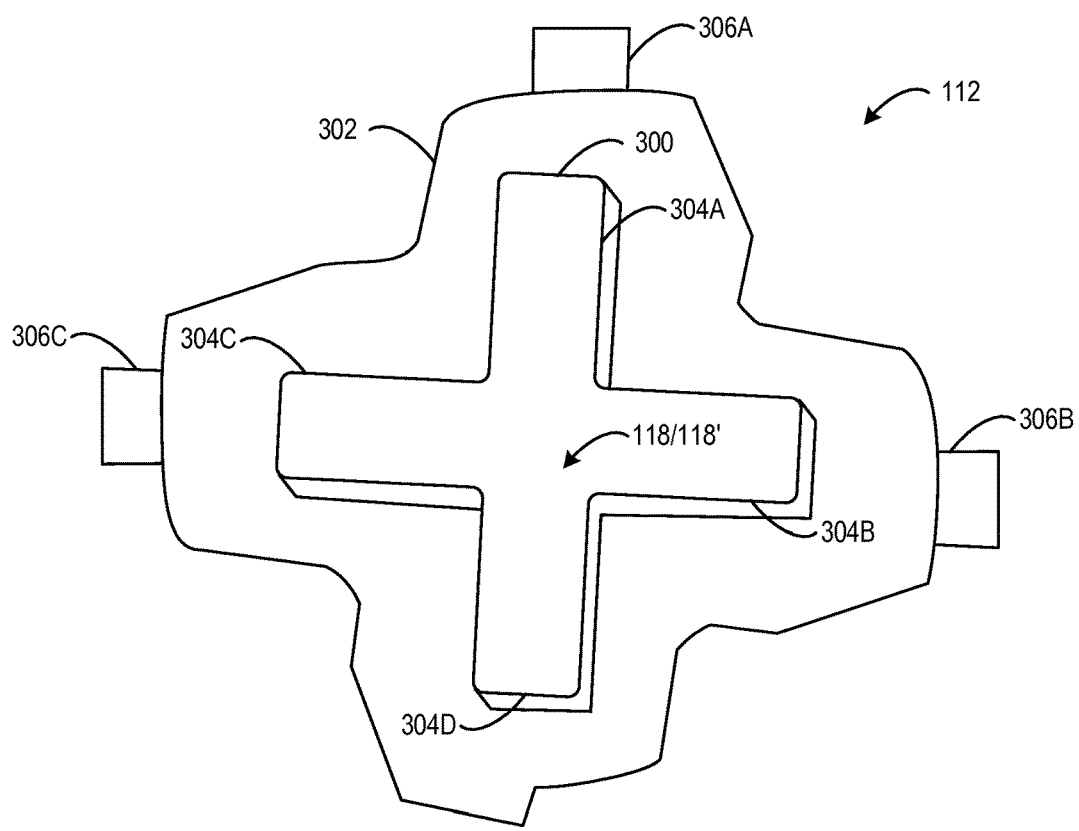
FIG. 3 shows a topside of the mounting platform of FIG. 2.
Figure 4:
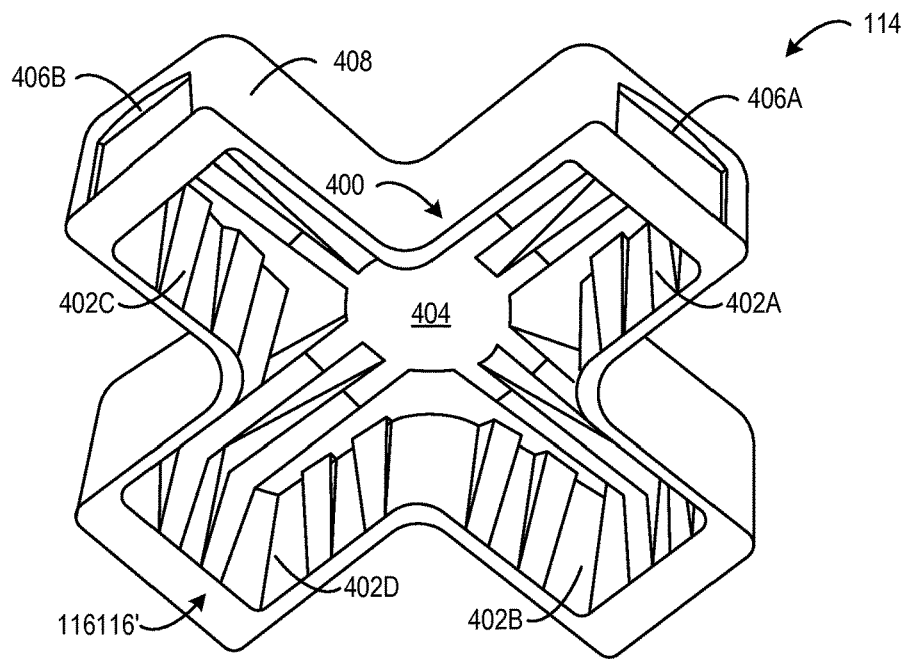
FIG. 4 shows an underside of the removable controller accessory of FIGS. 1-2.

FIGS. 3 and 4 show interfacing sides of the mounting platform 112 and the removable finger pad 114. In particular, FIG. 3 shows the topside 118 (e.g., the accessory-retention interface) of the mounting platform 112. The mounting platform 112 includes a cross-shaped protrusion 300 that extends from a base piece 302. The cross-shaped protrusion includes a plurality of branches 304 (e.g., 304A, 304B, 304C, 304D) that extend in different directions (e.g., up, down, left, right). In the depicted implementation, each of the plurality of branches 304 have the same length. In other implementations, different branches of the cross-shaped protrusion 300 may have different lengths. The mounting platform 112 may include any suitable number of branches that extend in any suitable direction(s). In some implementations, the mounting platform 112 may include an accessory-retention interface 118 having a non-branch shape. For example, the accessory-retention interface 118 may include a circle, triangle, square, star, or other shape.

Furthermore, the base piece 302 includes a plurality of mounting tabs 306 (e.g., 306A, 306B, 306C) that are configured to interact with the frame 120 (shown in more detail in FIG. 9) to couple the mounting platform 112 to the game controller 100. When the mounting platform 112 is coupled to the frame 120, the plurality of mounting tabs 306 may be inserted into corresponding mounting brackets 902 (shown in FIG. 9) of the frame 120 to inhibit the mounting platform 112 from twisting in the game controller 100.

FIG. 4 shows the underside 116 of the removable finger pad 114. The underside 116 may include a mounting interface 116' configured to have a shape that complements the shape of the accessory-retention interface (e.g., the cross-shaped protrusion 300) of the mounting platform 112. In particular, the underside 116 of the removable finger pad 114 may be concave to form a hollowed out cross-shaped cavity 400 including a plurality of valleys 402 (e.g., 402A, 402B, 402C, 402D). The cross-shaped cavity 400 may be sized slightly larger than the cross-shaped protrusion 300 such that when the removable finger pad 114 is installed on the mounting platform 112, the cross-shaped cavity 400 covers the cross-shaped protrusion 300. In particular, the plurality of valleys 402 may extend downward over the plurality of branches 304. In one example, the height of the cross-shaped protrusion 300 may be at least as great as a depth of the cross-shaped cavity 400 such that when the removable finger pad 114 is installed on the mounting platform 112, a floor 404 of the cross-shaped cavity 400 rests on the cross-shaped protrusion 300.

Furthermore, the removable finger pad 114 may include a plurality of grip notches 406 (e.g., 406A, 406B). Each of the plurality of grip notches 406 may be positioned on an exterior side 408 of each branch of the cross shape that spans between the topside 115 and the underside 116. The plurality of grip notches 406 may be configured to be gripped by fingers of a user to facilitate easy removal of the removable finger pad 114 from the mounting platform 112. The removable finger pad 114 may include any suitable number of grip notches 406, including zero grip notches.

The removable finger pad 114 may be made at least partially of ferromagnetic material, and the removable finger pad 114 may be removably affixable to the mounting platform 112 through a magnetic attraction between a plurality of magnets 506 (shown in FIG. 5) and the ferromagnetic material of the removable finger pad 114. In some implementations, the removable finger pad 114 may be a single ferromagnetic metal part. For example, the metal part may be injection-molded. In another example, the part may be machined from a single piece of metal. In other implementations, the removable finger pad 114 may be an assembly including one or more ferromagnetic parts.

Figure 5:
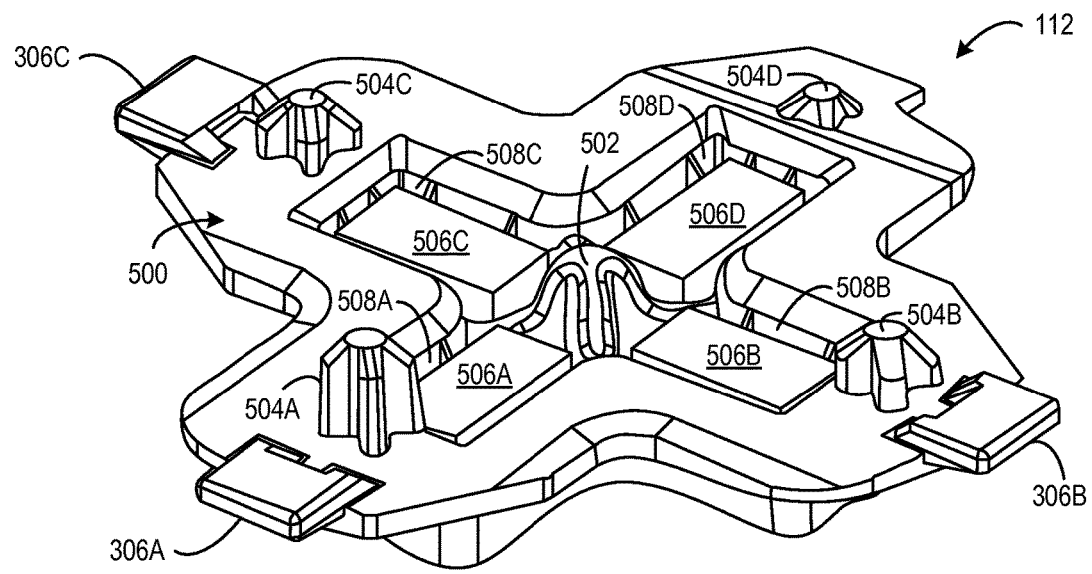
FIG. 5 shows an underside of the mounting platform of FIG. 2.
Figure 6:
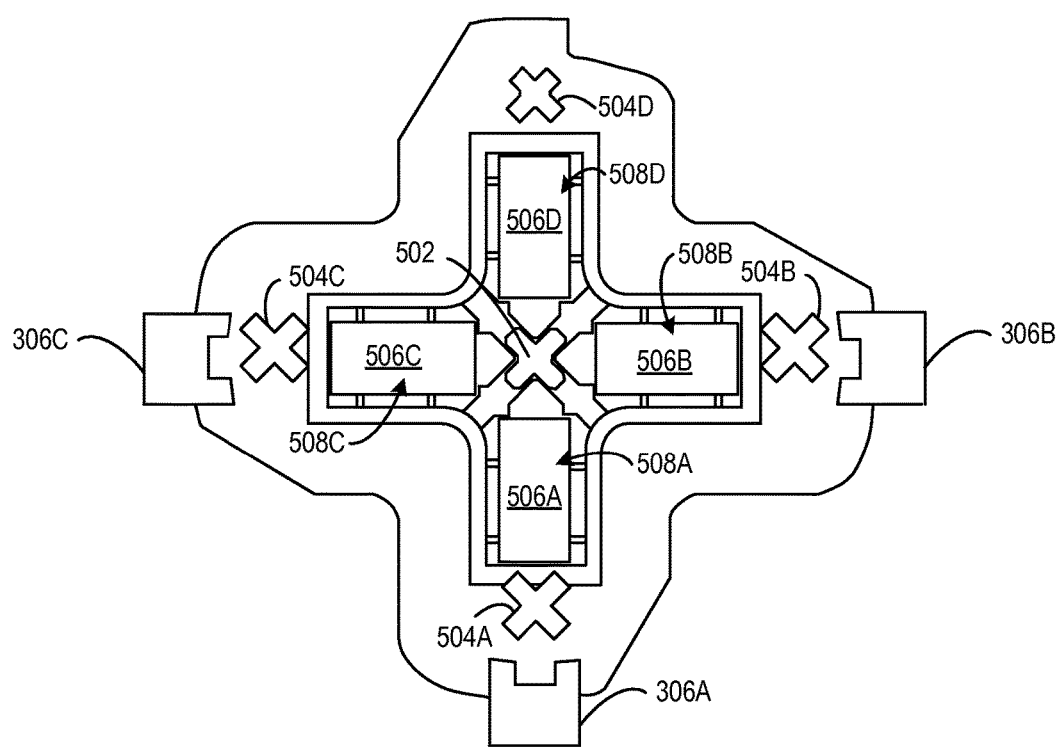
FIG. 6 shows the underside of the mounting platform of FIG. 2.
Figure 9:
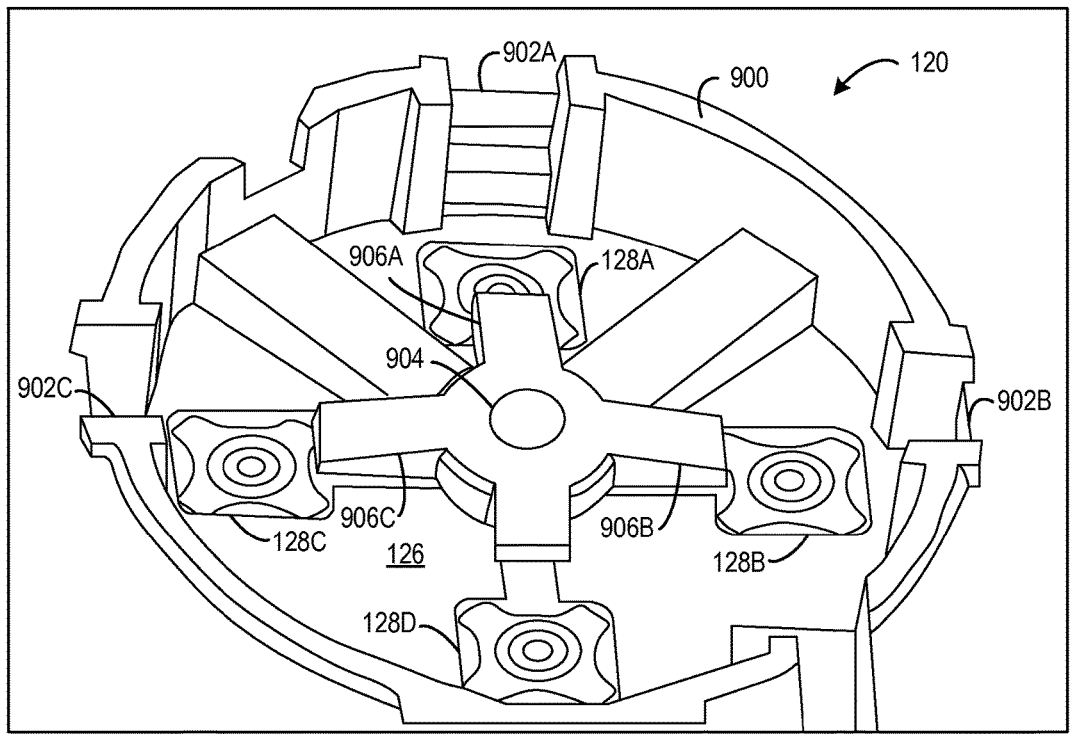
FIG. 9 shows a portion of a frame of the game controller of FIGS. 1-2.

FIG. 5-6 show an underside 500 of the mounting platform 112. The underside 500 of the mounting platform 112 may be configured to interface with the frame 120 (as shown in FIG. 9) to couple the mounting platform 112 to the game controller 100. In particular, the mounting platform 112 may include a pivot piece 502 configured to interface with a socket 904 (shown in FIG. 9) of the frame 120. The socket 904 and the pivot piece 502 may collectively form a joint about which the mounting platform 112 is pivotable in a plurality of directions (e.g., up, down, left, right) relative to the frame 120. The pivot piece 502 may be positioned in the center of the mounting platform 112 such that the mounting platform 112 may pivot in a similar manner (e.g., angle, distance) in each direction. Moreover, the plurality of mounting tabs 306 of the mounting platform 112 may be inserted into the corresponding plurality of mounting brackets 902 of the frame 120 to inhibit the mounting platform 112 from twisting relative to the frame 120, when the mounting platform 112 pivots in a particular direction.

The mounting platform 112 may assume a directionally-neutral default posture when the pivot piece 502 is centered in the socket 904. Further, the mounting platform 112 may be configured to move from the default posture to an activation posture in which the mounting platform 112 pivots away from the directionally-neutral default posture. For example, the mounting platform 112 may move from the default posture to a selected activation posture responsive to a touch force being applied to the removable finger pad 114.

In some implementations, the mounting platform 112 may be configured to pivot into any one of four activation postures corresponding to the plurality of branches 304 of the mounting platform 112. In other implementations, the mounting platform 112 may be configured to pivot into any one of eight activation postures corresponding to the plurality of branches 304 as well as the diagonals between the branches. In other implementations, the mounting platform 112 may be configured to pivot into any one of a number of activation postures other than four or eight. For example, the mounting platform 112 may be configured to pivot into any one of two or more activation postures.

The mounting platform 112 may include a plurality of sensor-activation features herein depicted in the form of projections 504 (e.g., 504A, 504B, 504C, 504D). The plurality of projections 504 may be positioned on the underside 500 of the mounting platform 112 to align with a plurality of electronic input sensors 128 (e.g., 128A, 128B, 128C, 128D shown in FIG. 9) when the mounting platform 112 is coupled to the frame 120. In particular, when the mounting platform 112 is in the default posture, the plurality of projections 504 may hang over (or touch) the plurality of electronic input sensors 128 without activating the plurality of electronic input sensors 128. In other words, when the mounting platform is in the default posture, none of the electronic input sensors 128 may generate an activate control signal indicative of user input.

Furthermore, when the mounting platform 112 moves from the default posture to a selected activation posture, one or more projections 504 may interface with one or more corresponding electronic input sensors 128 to generate one or more activate control signals indicative of user input. For example, when an "up" touch force is applied to the removable finger pad 114, projection 504A is pushed into corresponding electronic input sensor 128A to generate an activate control signal indicative of user input in the "up" direction.

The projections 504 are merely one non-limiting example of a sensor-activation feature of the mounting platform 112. A sensor-activation feature may take any suitable form. Moreover, the mounting platform 112 may include any suitable number of sensor-activation features configured to interface with any suitable number of electronic input sensors.

The mounting platform 112 may include a plurality of accessory-retention features herein depicted in the form of magnets 506 (e.g., 506A, 506B, 506C, 506D) configured to removably affix the removable finger pad 114 to the mounting platform 112. The plurality of magnets 506 may be positioned in a plurality of troughs 508 (e.g., 508A, 508B, 508C, 508D) formed underneath the cross-shaped protrusion 300 (shown in FIG. 3). The plurality of troughs 508 may have a depth to accommodate the plurality of magnets 506 such that the plurality of magnets are at least flush (or recessed) with the underside 500 of the mounting platform 112. The plurality of magnets 506 may be coupled to the plurality of troughs 508 in any suitable manner For example, the plurality of magnets 506 may be coupled to the plurality of troughs 508 using pressure-sensitive adhesive.

Figure 7:
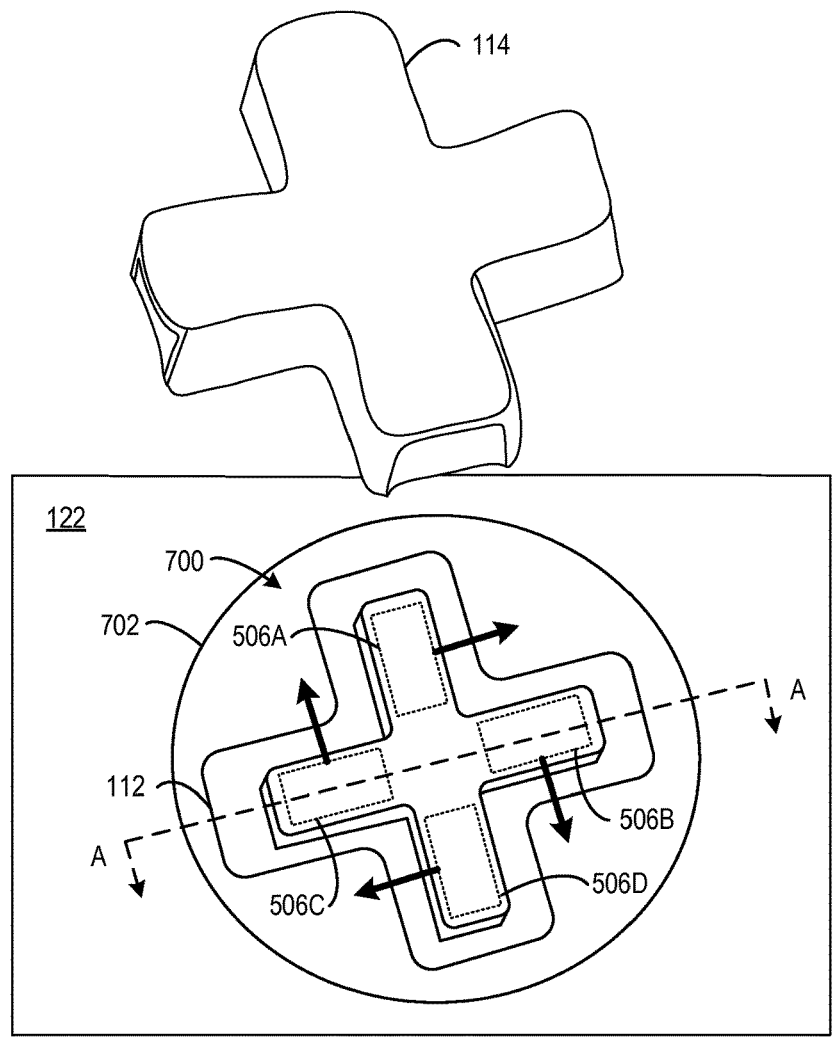
FIG. 7 shows the removable controller accessory aligned to be installed on the mounting platform of the game controller of FIGS. 1-2.
Figure 8:
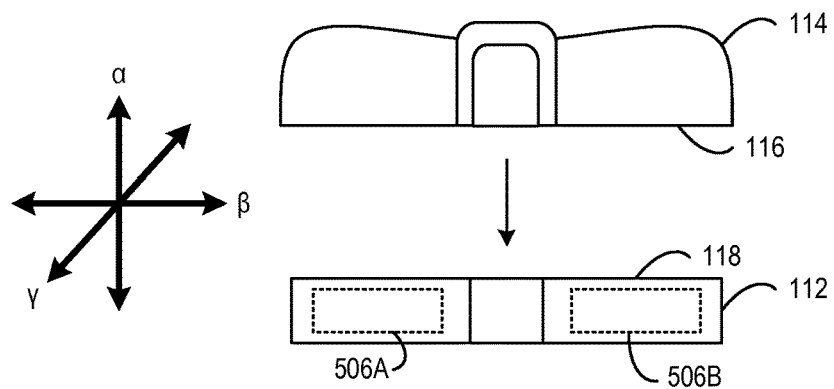
FIG. 8 shows a sectional view of the removable controller accessory and the mounting platform of the game controller of FIGS. 1-2 taken along line A-A of FIG. 7.

FIGS. 7-8 show the removable finger pad 114 aligned to be installed on the mounting platform 112. In FIG. 7, the mounting platform 112 is mounted to the frame 120 (as shown in FIG. 9), and the mounting platform 112 protrudes through an aperture 700 defined by a rim 702 located on the upper housing portion 122. As shown in FIG. 8, the removable finger pad 114 may be removably affixed to the mounting platform 112 along an interface direction ($\alpha$). Further, the plurality of magnets 506 each may be positioned such that a pole of each magnet extends in a direction (e.g., $\beta$ or $\gamma$) that is not parallel to the interface direction ($\alpha$) between the removable finger pad 114 and the mounting platform 112. In one particular example, the pole of each magnet may extend in a direction that is perpendicular to the interface direction ($\alpha$). Further, each magnet may be positioned such that a pole of the magnet is orientated in a direction that is rotated ninety degrees away from a pole of each neighboring magnet.

Such a magnet orientation may allow the removable finger pad 114 to slide beyond the topside 118 of the mounting platform 112 to allow the removable controller accessory to cover the mounting platform 112. If the plurality of magnets were oriented such that a pole of each magnet extended in the interface direction ($\alpha$) or a direction parallel to the interface direction, then the underside 116 of the removable finger pad 114 would be attracted to the topside 118 of the mounting platform 112. Such a configuration would make it difficult for the valleys 402 of the removable finger pad 114 to slide over the branches 304 of the cross-shaped protrusion 300.

Note that the corresponding cross-shaped features of the mounting platform 112 and the removable finger pad 114 as well as the corresponding plurality of magnets and the ferromagnetic material all may act as accessory-retention features that contribute to making the removable finger pad 114 removably affixable to the mounting platform 112. In particular, the corresponding cross-shaped features of the mounting platform 112 and the removable finger pad 114 may cooperate to initially align the removable finger pad 114 with the mounting platform 112. Further, the plurality of magnets 506 and the ferromagnetic material may cooperate to retain the removable finger pad 114 affixed to the mounting platform 112.

Any suitable number of magnets 506 may be employed to removably affix the removable finger pad 114 to the mounting platform 112. Moreover, such magnets 506 may take any suitable form. For example, a single large ring magnet may be used in place of the four rectangular magnets of the depicted implementation. In order to accommodate a ring magnet, the mounting platform 112 and the removable finger pad 114 may have a circular or toroidal shape instead of a cross shape. Such an implementation would still allow for the pivot piece 502 to be positioned at the center of the mounting platform 112. Further, the plurality of magnets 506 may be oriented in the mounting platform 112 according to any suitable orientation.

Furthermore, in some implementations, the removable finger pad 114 may include magnets and the mounting platform 112 may be made at least partially of ferromagnetic material that is configured to be attracted to the plurality of magnets of the removable finger pad 114. In some implementations, both the removable finger pad 114 and the mounting platform 112 may include magnets that are configured to be attracted to each other.

FIG. 9 shows a portion of the frame 120 without the mounting platform 112 installed on the frame 120. The plurality of mounting brackets 902 may be used to align the mounting platform 112 with the frame 120 such that the pivot piece 502 may interface with the socket 904 to collectively form a joint about which the mounting platform 112 is pivotable in a plurality of directions relative to the frame 120. Further, the plurality of mounting brackets 902 (e.g., 902A, 902B, 902C) may be sunken below a rim 900 of the frame 120 in order to accommodate the plurality of mounting tabs 306 such that the mounting platform 112 may be prevented from twisting relative to the frame 120 when the mounting platform 112 pivots in a given direction.

The printed circuit board 126 may be coupled beneath the frame 120 such that the plurality of electronic input sensors, depicted herein in the form of a plurality of dome switches 128 (e.g., 128A, 128B, 128C, 128D), may be aligned to interact with the plurality of projections 504 when the mounting platform 112 is installed on the frame 120. In particular, the plurality of dome switches 128 may be recessed relative to the frame 120, and more particularly relative to the socket 904 such that when the mounting platform 112 is in the default posture, the plurality of projections 504 do not activate the plurality of dome switches 128. Moreover, when the mounting platform 112 pivots from the default posture to an activation posture in a particular direction, a projection 504 corresponding to the direction may be lowered to activate a corresponding dome switch 128.

The frame 120 includes a plurality of supports 906 (e.g., 906A, 906B, 906C, 906D) that extend out from the socket 904. The plurality of supports 906 may be positioned to align with the plurality of troughs 508 of the mounting platform 112 when the mounting platform 112 is installed on the frame 120. In particular, each support may be configured to extend at least to an opening of a corresponding trough to maintain a magnet in the trough when the mounting platform 112 is installed on the frame 1120. The plurality of supports 906 may act as magnet retention features that may keep the magnets in the troughs even when an adhesive or other coupling mechanism fails.

Figure 10:
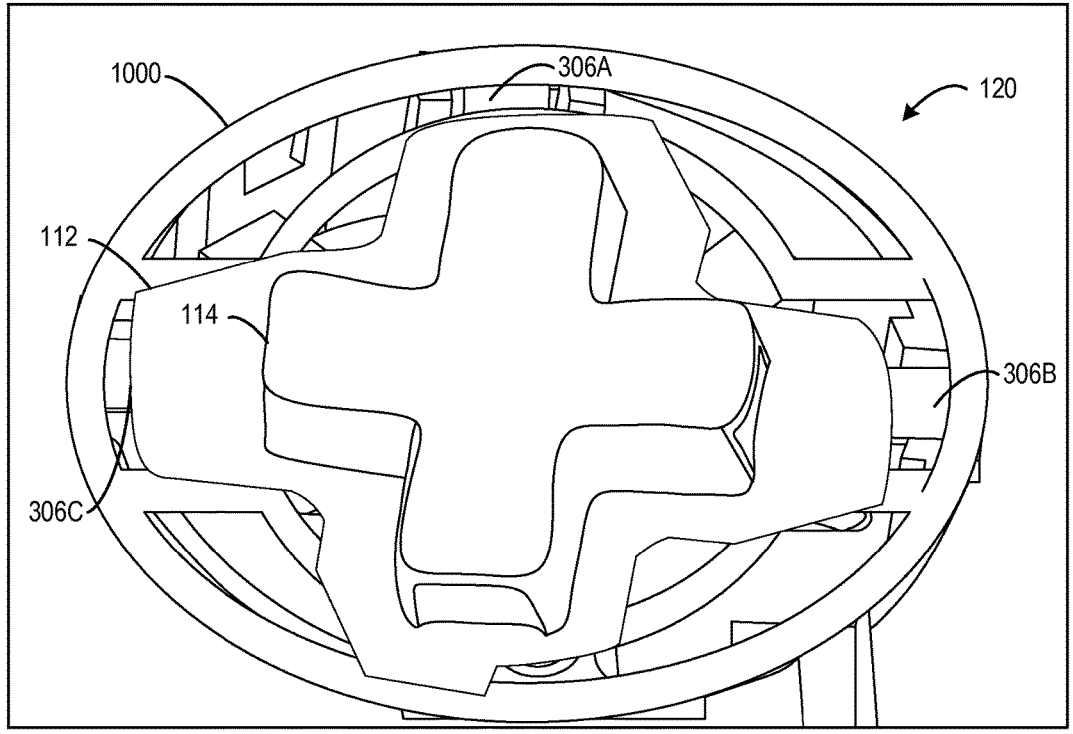
FIG. 10 shows a partial cutaway view of the portion of the frame of FIG. 9 with the mounting platform installed on the frame, the removable controller accessory removably affixed to the mounting platform, and an upper housing portion removed.

FIG. 10 shows a portion of the frame 120 with the mounting platform 112 installed on the frame 120, the removable finger pad 114 removably affixed to the mounting platform 112, and the upper housing portion 122 removed to show the underlying structure. In particular, a spring clip 1000 may be positioned between the frame 120 and the mounting platform 112, and the plurality of mounting tabs 306 may extend under the spring clip 1000 to couple the mounting platform 112 to the frame 120. The spring clip 1000 may be configured to return the mounting platform 112 from an activation posture to the default posture when a touch force to the removable finger pad 114 has been lifted. For example, when the removable finger pad 114 is depressed, the spring clip 1000 resists the depressions and biases the removable finger pad 114 towards popping back up to the default posture. Note that the spring clip 1000 may be covered by the upper housing portion 122 (shown in FIG. 2) of the game controller 100, and the mounting platform 112 may be exposed via the aperture 700 (as shown in FIG. 7) defined by the rim 702 located on the upper housing portion 122.

In some implementations, different variations of the removable finger pad 114 having differing attributes may be swapped on the mounting platform 112. Non-limiting examples of such differing attributes, may include different branch thickness of the cross shape, different cross height, different branch angles, different materials, different surface textures, additional tactile features (e.g., bumps), different colors, different artwork, and other attributes.

Figure 11:
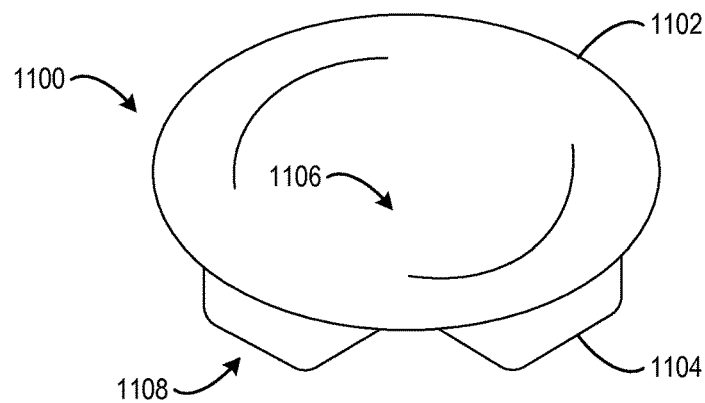
FIG. 11 shows an example removable controller accessory having a finger interface that includes a concave dish having a smooth surface.
Figure 12:
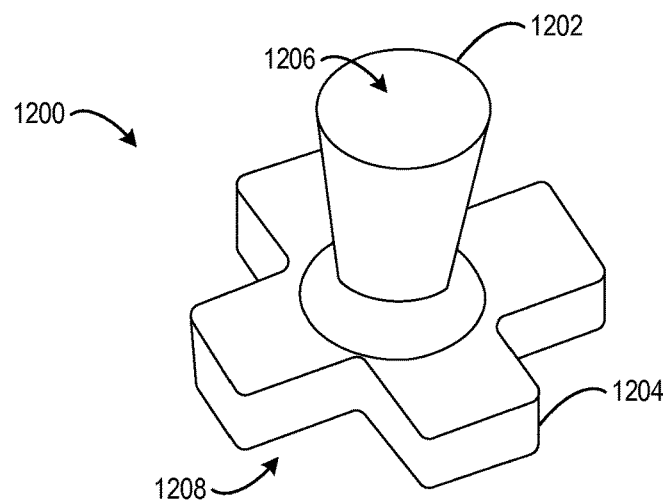
FIG. 12 shows an example removable controller accessory having a finger interface that includes a joystick.
Figure 13:
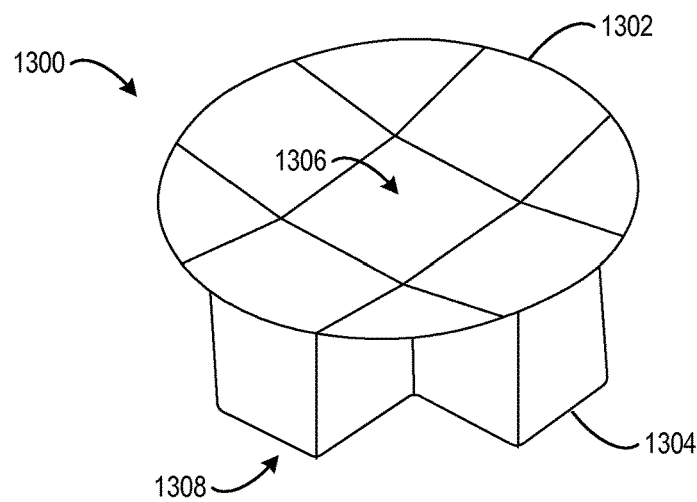
FIG. 13 shows an example removable controller accessory including nine planar facets.

In some implementations, differently configured removable controller accessories other than a removable finger pad may be removably affixed to the mounting platform 112. FIGS. 11-13 show non-limiting examples of some such removable controller accessories. FIG. 11 shows a removable controller accessory 1100 including a topside 1102 and an underside 1104 opposite the topside 1102. The topside 1102 includes a finger interface 1106 sized and shaped for manual manipulation by a finger. In the depicted implementation, the finger interface 1106 includes a concave dish having a smooth surface. Such a finger interface may mimic a contour of a user's thumb. For example, the smooth surface of the rounded dish may be useful for applications where large circular rotations of the directional pad may be performed frequently. In another implementation, the finger interface 1106 may include a concave dish having a textured surface (e.g., bumps, ridges, depressions, or patterns).

Furthermore, the underside 1104 includes a mounting interface 1108 configured to selectively mate with an accessory-retention feature of the mounting platform 112 of the game controller 100 to removably affix the removable controller accessory 1100 to the mounting platform 112. In the depicted implementation, the mounting interface 1108 may include a cross-shaped concave cavity that is configured to mate with the cross-shaped protrusion 300 of the mounting platform 112. In other words, the mounting interface 1108 may have features that compliment features of the mounting interface 116' of the removable finger pad 114 (shown in FIG. 4). In some implementations, the removable controller accessory 1100 may be made at least partially of ferromagnetic material that is configured to have a magnetic attraction to the magnets 506 of the mounting platform 112.

FIG. 12 shows a removable controller accessory 1200 including a topside 1202 and an underside 1204 that is opposite the topside 1202. The topside 1202 includes a finger interface 1206 depicted in the form of a joystick. The joystick may provide a movable shaft or lever that can be easily flicked in a particular direction. For example, such a lever may be useful for applications where the same control (or direction) is activated repeatedly, such as to scroll through items in an inventory. Furthermore, the underside 1204 includes a mounting interface 1208 configured in the same manner as the mounting interface 1108 of the removable controller accessory 1100.

FIG. 13 shows a removable controller accessory 1300 including a topside 1302 and an underside 1304 that is opposite the topside 1302. The topside 1302 includes a finger interface 1306 depicted in the form of a concave dish including a plurality of planar facets. Furthermore, the underside 1304 includes a mounting interface 1308 configured in the same manner as the mounting interface 1108 of the removable controller accessory 1100 and the mounting interface 1208 of the removable controller accessory 1200.

Because the removable controller accessories 114, 1100, 1200, and 1300 all have similarly configured mounting interfaces that are configured to mate with the mounting platform 112, each of these removable controller accessories may be quickly and easily swapped on the game controller 100.

In some implementations, the mounting platform 112 of the game controller 100 alternatively or additionally may include one or more non-magnetic accessory-retention features. Moreover, in such implementations, a removable controller accessory may include a mounting interface configured to mate with such accessory-retention features to removably affix the removable controller accessory to the mounting platform.

Figure 14:
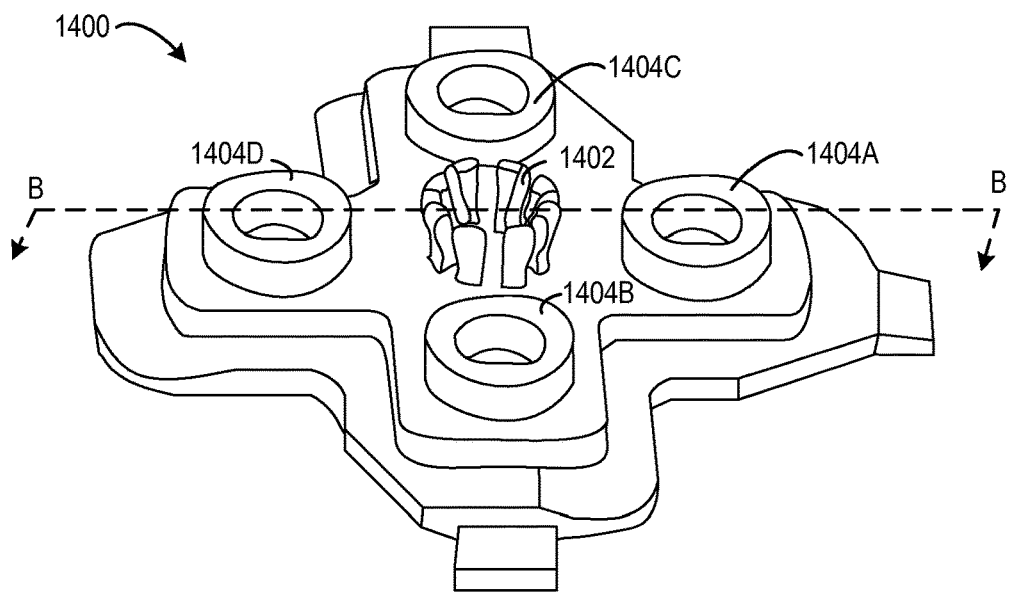
FIG. 14 shows an example mounting platform including a snap fastener and corresponding alignment features.
Figure 15:
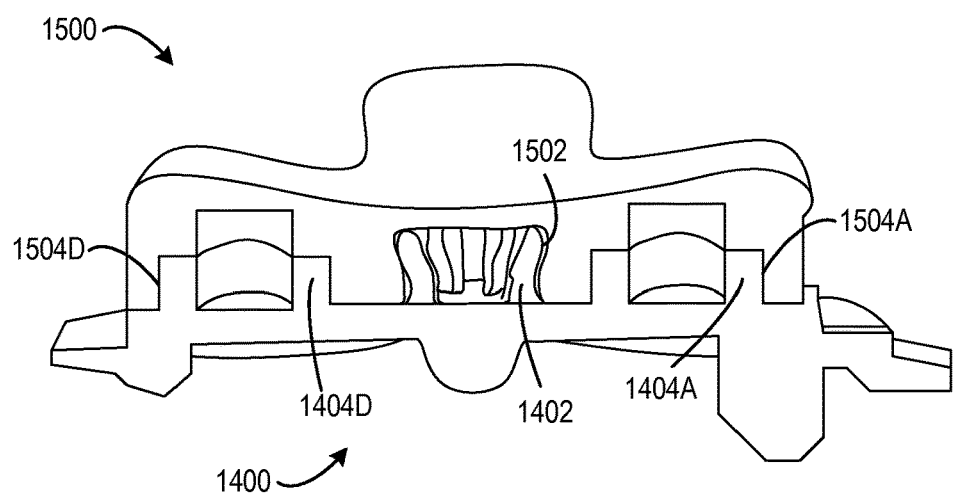
FIG. 15 shows a sectional view of an example removable controller accessory including a snap fastener and corresponding alignment features configured to interface with the mounting platform taken along line B-B of FIG. 14.

FIGS. 14-15 show an example configuration in which a snap fastener is employed as an accessory-retention feature to removably affix a removable controller accessory 1500 to a mounting platform 1400. In particular, the mounting platform 1400 includes a snap fastener 1402. The snap fastener 1402 may be configured to interlock with a corresponding mating feature 1502 of the removable controller accessory 1500 to removably affix the removable controller accessory 1500 to the mounting platform 1400. In the depicted implementation, the mounting platform 1400 also includes a plurality of alignment features 1402 (e.g., 1402A, 1402B, 1403C, 1402D) configured to fit into a plurality of cavities 1502 (e.g., 1502A, 1502B, 1502C, 1502D) of the removable controller accessory 1500 to prevent the removable controller accessory 1500 from translating or rotating relative to the mounting platform 1400.

Any suitable number of cooperating snap fasteners, mating features, and/or alignment features may be employed on the mounting platform 1400 and the removable controller accessory 1500 to removably affix the removable controller accessory 1500 to the mounting platform 1400. Moreover, the snap fasteners may take any suitable form. Furthermore, the snap fasteners may be positioned either at the center of the mounting platform, towards the extremities, or both. In some implementations, the snap fastener(s) 1402 may be located on the removable controller accessory 1500 and the mating feature(s) 1502 may be located on the mounting platform 1400. In some implementations, a subset of snap fasteners and mating features may be located on the removable controller accessory 1500 and another subset of snap fasteners and mating features may be located on the mounting platform 1400.

Figure 16:
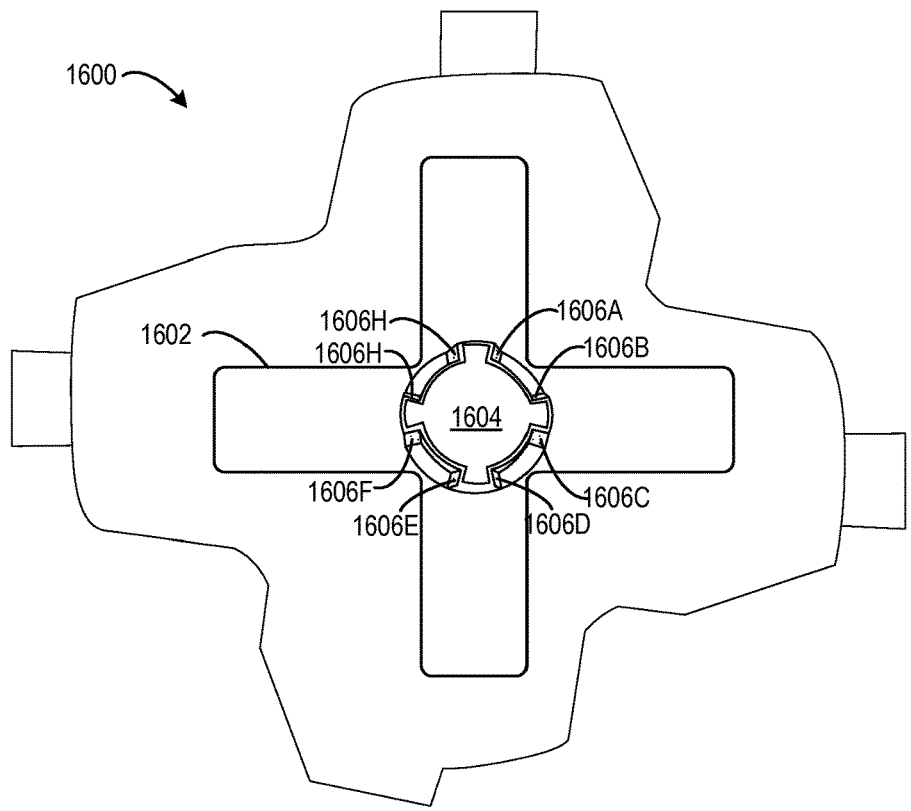
FIG. 16 shows a topside of an example mounting platform including wedge fasteners.
Figure 17:
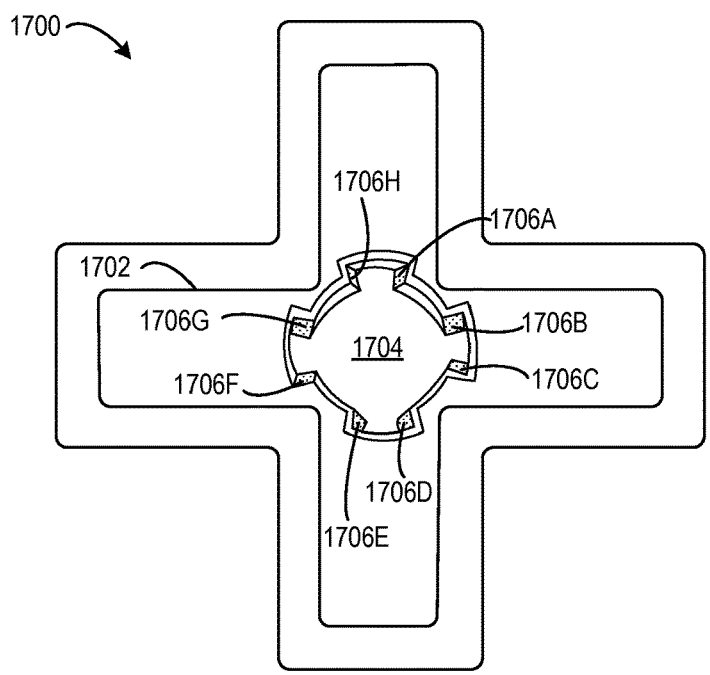
FIG. 17 shows an underside of an example removable controller accessory including wedge fasteners that are configured to selectively mate with the wedge fasteners of the mounting platform of FIG. 16.

FIGS. 16-17 show an example configuration in which complimentary wedge surfaces are employed as accessory-retention features to removably affix a removable controller accessory 1700 to a mounting platform 1600. The mounting platform 1600 includes a cross-shaped alignment feature 1602. The alignment feature 1602 may be either raised or depressed to align with a cross-shaped alignment feature 1702 of the removable controller accessory 1700.

The mounting platform 1600 includes a protrusion 1604 that includes a plurality of wedge surfaces 1606 (e.g., 1606A, 1606B, 1606C, 1606D, 1606E, 1606F, 1606G, 1606H). Further, the removable controller accessory 1700 includes a cavity 1704 that includes a plurality of wedge surfaces 1706 (e.g., 1706A, 1706B, 1706C, 1706D, 1706E, 1706F, 1706G, 1706H). When the removable controller accessory 1700 is removably affixed to the mounting platform 1600, the cavity 1704 may mate with the protrusion 1604 of the mounting platform such that complimentary wedge surfaces of the mounting platform 1600 and the removable controller accessory 1700 interface with each other. In particular, friction between the complimentary wedge surfaces may removably affix the removable controller accessory 1700 to the mounting platform 1600. In some implementations, the complimentary wedge surfaces may have high-friction textures that increase friction between complimentary wedge surfaces. The mounting platform 1600 and the removable controller accessory 1700 may include any suitable number of complimentary pairs of wedge surfaces. Moreover, the complimentary pairs of wedge surfaces may take any suitable form (e.g., different angles, lengths, orientations).

Figure 18:
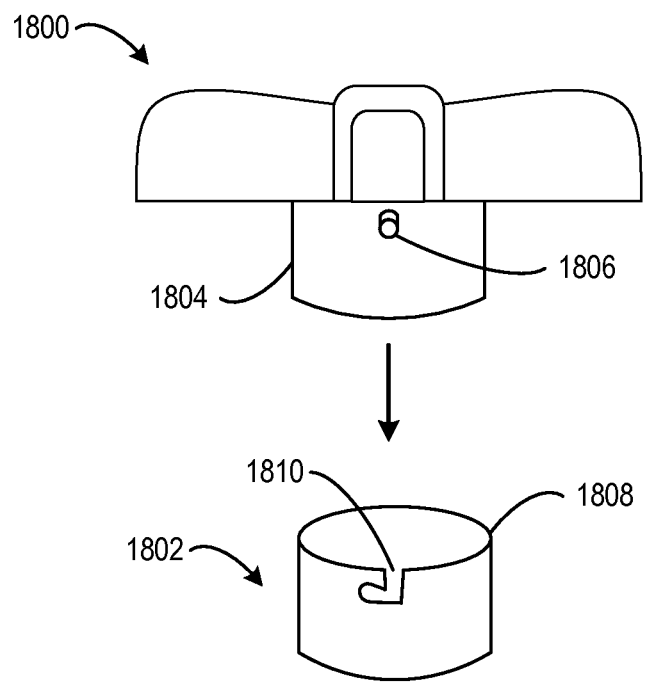
FIG. 18 shows an example removable controller accessory including a male portion of a twist-to-lock mechanism and an example mounting platform including a female portion of a twist-to-lock mechanism.
Figure 19:
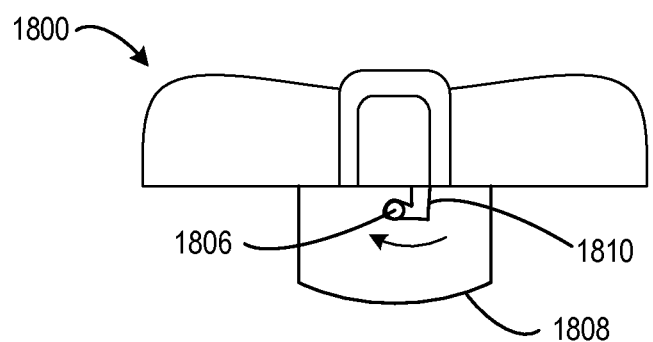
FIG. 19 shows the removable controller accessory of FIG. 18 removably affixed to the mounting platform via the twist-to-lock mechanism.

FIGS. 18-19 show an example configuration in which a twist-to-lock mechanism is employed as an accessory-retention feature to removably affix a removable controller accessory 1800 to a mounting platform 1802. The removable controller accessory 1800 includes a male portion 1804 and a radial pin 1806 that extends radially outward from the male portion 1804. Further, the mounting platform 1802 includes a female portion 1808 having a side in which an L-shaped slot 1810 is formed. The male portion 1804 may be inserted into the female portion 1808 until the radial pin 1806 is stopped at a heel of the L-shaped slot 1810. The removable controller accessory 1800 may be rotated clockwise to move the radial pin 1806 to a toe of the L-shaped slot 1810 to affix the removable controller accessory 1800 to the mounting platform 1802.

The twist-to-lock mechanism may take any suitable form. For example, the removable controller accessory may include any suitable number of radial pins. In another example, the mounting platform 1802 may include a slot having any suitable shape. In some implementations, the male portion may be biased upward such that radial pin is pushed upward into a toe catch of an L-shaped slot. In another example, the radial pin may be outwardly biased, and the toe of the slot may include a depressable catch. In such a configuration the catch may be depressed to release the pin from the toe in order for the male portion to be twisted relative to the female portion.

In other implementations, the mounting platform and the removable controller accessory may include cooperating screw threads that act as accessory-retention features to removably affix the removable controller accessory to the mounting platform by screwing the removable controller accessory onto the mounting platform.

Although the concept of swappable accessories are discussed mainly in the context of a game controller, such concepts may be broadly applicable to any suitable user input control device.

In another example implementation, a removable finger pad for a game controller comprises a first side and a second side opposite the first side. The first side includes a finger interface. The finger interface may be sized and shaped for manual manipulation by a finger. The second side includes a mounting interface configured to selectively mate with an accessory-retention feature of a mounting platform of the game controller to removably affix the removable finger pad to the mounting platform. In one example implementation that optionally may be combined with any of the features described herein, the mounting interface is made at least partially of ferromagnetic material. The accessory-retention feature of the mounting platform includes one or more magnets. The removable finger pad is removably affixable to the mounting platform through a magnetic attraction between the one or more magnets and the ferromagnetic material. In one example implementation that optionally may be combined with any of the features described herein, the removable finger pad is a single metal injection molded ferromagnetic part. In one example implementation that optionally may be combined with any of the features described herein, the finger interface is cross-shaped. In one example implementation that optionally may be combined with any of the features described herein, the finger interface includes a concave dish having a smooth surface. In one example implementation that optionally may be combined with any of the features described herein, the finger interface includes a concave dish having a textured surface. In one example implementation that optionally may be combined with any of the features described herein, the mounting interface includes one or more snap fasteners. The accessory-retention feature of the mounting platform includes one or more corresponding snap fasteners configured to interlock with one or more snap fasteners of the removable finger pad to removably affix the removable finger pad to the mounting platform. In one example implementation that optionally may be combined with any of the features described herein, the mounting interface and the accessory-retention feature collectively form a twist-to-lock mechanism. In one example implementation that optionally may be combined with any of the features described herein, the mounting interface includes a cross-shaped cavity configured to cover a cross-shaped protrusion of the mounting platform when the removable finger pad is removably affixed to the mounting platform. In one example implementation that optionally may be combined with any of the features described herein, the removable finger pad comprises a third side between the first side and the second side. The third side includes a grip notch configured to be gripped by a finger.

In another example implementation, a removable controller accessory for a game controller comprises a first side and a second side opposite the first side. The first side includes a finger interface. The finger interface may be sized and shaped for manual manipulation by a finger. The second side includes a mounting interface made at least partially of ferromagnetic material such that one or more magnets of a mounting platform of the game controller magnetically attract the removable controller accessory to the mounting platform. In one example implementation that optionally may be combined with any of the features described herein, the removable controller accessory is a single metal injection molded ferromagnetic part. In one example implementation that optionally may be combined with any of the features described herein, the mounting interface includes a cross-shaped cavity configured to cover a cross-shaped protrusion of the mounting platform when the removable controller accessory is removably affixed to the mounting platform. In one example implementation that optionally may be combined with any of the features described herein, the finger interface includes a cross-shaped directional pad. In one example implementation that optionally may be combined with any of the features described herein, the finger interface includes a concave dish having a smooth surface. In one example implementation that optionally may be combined with any of the features described herein, the finger interface includes a concave dish having a textured surface. In one example implementation that optionally may be combined with any of the features described herein, the finger interface includes a joystick.

In another example implementation, a removable controller accessory for a game controller comprises a first side and a second side opposite the first side. The first side includes a finger interface. The finger interface may be sized and shaped for manual manipulation by a finger. The second side includes a mounting interface configured to selectively mate with a mounting platform of the game controller to removably affix the removable controller accessory to the mounting platform. The mounting interface includes a cross-shaped cavity configured to cover a cross-shaped protrusion of the mounting platform when the removable controller accessory is removably affixed to the mounting platform. In one example implementation that optionally may be combined with any of the features described herein, the mounting interface is made at least partially of ferromagnetic material such that one or more magnets of the mounting platform magnetically attract the removable controller accessory to the mounting platform. In one example implementation that optionally may be combined with any of the features described herein, the finger interface includes a cross-shaped directional pad.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A removable finger pad for a game controller including an electronic input sensor, the removable finger pad comprising:
   a ferromagnetic material;
   a first side including a finger interface, the finger interface sized and shaped for manual manipulation by a finger; and
   a second side opposite the first side, the second side including a mounting interface configured to selectively mate with a magnetic mounting platform of the game controller to magnetically affix the removable finger pad to the magnetic mounting platform through a magnetic attraction between the ferromagnetic material and the magnetic mounting platform, wherein the magnetic mounting platform is positioned intermediate the electronic input sensor and the removable finger pad when the removable finger pad is affixed to the magnetic mounting platform, wherein finger manipulation moves the magnetic mounting platform from a default posture to an activation posture when the removable finger pad is affixed to the magnetic mounting platform, and wherein the magnetic mounting platform is configured to interface with the electronic input sensor to generate an activate control signal based on finger manipulation of the finger interface.

2. The removable finger pad of claim 1, wherein the mounting interface is made at least partially of ferromagnetic material, wherein the magnetic mounting platform includes one or more magnets, and wherein the removable finger pad is removably affixable to the magnetic mounting platform through a magnetic attraction between the one or more magnets and the ferromagnetic material.

3. The removable finger pad of claim 2, wherein the removable finger pad is a single metal injection molded ferromagnetic part.

4. The removable finger pad of claim 1, wherein the finger interface is cross-shaped.

5. The removable finger pad of claim 1, wherein the finger interface includes a concave dish having a smooth surface.

6. The removable finger pad of claim 1, wherein the finger interface includes a concave dish having a textured surface.

7. The removable finger pad of claim 1, wherein the mounting interface includes a cross-shaped cavity configured to cover a cross-shaped protrusion of the magnetic mounting platform when the removable finger pad is removably affixed to the magnetic mounting platform.

8. The removable finger pad of claim 1, further comprising:
a third side between the first side and the second side, the third side including a grip notch configured to be gripped by a finger.

9. A removable controller accessory for a game controller including an electronic input sensor, the removable controller accessory comprising:
a first side including a finger interface, the finger interface sized and shaped for manual manipulation by a finger; and
a second side opposite the first side, the second side including a mounting interface made at least partially of ferromagnetic material such that one or more magnets of a mounting platform of the game controller magnetically attract the removable controller accessory to the mounting platform, wherein the mounting platform is positioned intermediate the electronic input sensor and the removable controller accessory when the removable controller accessory is affixed to the mounting platform, wherein finger manipulation moves the mounting platform from a default posture to an activation posture when the removable controller accessory is affixed to the mounting platform, wherein the one or more magnets move with the mounting platform when the mounting platform moves from the default posture to the activation posture, and wherein the mounting platform is configured to interface with the electronic input sensor to generate an activate control signal based on finger manipulation of the removable controller accessory.

10. The removable controller accessory of claim 9, wherein the removable controller accessory is a single metal injection molded ferromagnetic part.

11. The removable controller accessory of claim 9, wherein the mounting interface includes a cross-shaped cavity configured to cover a cross-shaped protrusion of the mounting platform when the removable controller accessory is removably affixed to the mounting platform.

12. The removable controller accessory of claim 9, wherein the finger interface includes a cross-shaped directional pad.

13. The removable controller accessory of claim 9, wherein the finger interface includes a concave dish having a smooth surface.

14. The removable controller accessory of claim 9, wherein the finger interface includes a concave dish having a textured surface.

15. The removable controller accessory of claim 9, wherein the finger interface includes a joystick.

16. A removable controller accessory for a game controller including a plurality of electronic input sensors, the removable controller accessory comprising:
a first side including a finger interface, the finger interface sized and shaped for manual manipulation by a finger; and
a second side opposite the first side, the second side including a mounting interface configured to selectively mate with a mounting platform of the game controller to removably affix the removable controller accessory to the mounting platform, the mounting interface including a cross-shaped cavity configured to cover a cross-shaped protrusion of the mounting platform when the removable controller accessory is removably affixed to the mounting platform, wherein the mounting platform is positioned intermediate the electronic input sensor and the removable controller accessory when the removable controller accessory is affixed to the mounting platform, wherein finger manipulation moves the mounting platform from a default posture to a selected activation posture when the removable controller accessory is affixed to the mounting platform, wherein the selected activation posture is one of four activation postures corresponding to four branches of the cross-shaped protrusion, wherein each of the four branches of the cross-shaped protrusion move together when the mounting platform moves from the default posture to the selected activation posture, and wherein the mounting platform is configured to interface with a selected electronic input sensor of the plurality of electronic input sensors to generate an activate control signal based on finger manipulation of the removable controller accessory.

17. The removable controller accessory of claim 16, wherein the mounting interface is made at least partially of ferromagnetic material such that one or more magnets of the mounting platform magnetically attract the removable controller accessory to the mounting platform.

18. The removable controller accessory of claim 16, wherein the finger interface includes a cross-shaped directional pad.

* * * * *